(12) United States Patent
Humphrey et al.

(10) Patent No.: US 6,591,413 B1
(45) Date of Patent: Jul. 8, 2003

(54) METHOD AND APPARATUS IN A DATA PROCESSING SYSTEM FOR FASTER NOTIFICATION OF ERRORS IN A SOFTWARE BUILD

(75) Inventors: Randy Scott Humphrey, Austin, TX (US); Steven Donald Turner, Round Rock, TX (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,902

(22) Filed: Oct. 7, 1999

(51) Int. Cl.[7] .................................................. G06F 9/44
(52) U.S. Cl. ..................... 717/125; 717/106; 717/124; 714/48; 714/52; 714/25
(58) Field of Search ................................ 717/106, 124, 717/143, 145, 125; 714/48, 52, 703, 100, 25

(56) References Cited

U.S. PATENT DOCUMENTS

| | | | | |
|---|---|---|---|---|
| 4,622,633 A | | 11/1986 | Ceccon et al. ............... 364/200 |
| 5,428,791 A | | 6/1995 | Andrew et al. ............... 395/700 |
| 5,600,789 A | * | 2/1997 | Parker et al. .................. 714/38 |
| 5,745,689 A | * | 4/1998 | Yeager et al. ................. 395/200 |
| 5,748,961 A | | 5/1998 | Hanna et al. ................. 395/701 |
| 5,752,034 A | | 5/1998 | Srivastava et al. ........... 395/704 |
| 5,758,160 A | | 5/1998 | McInerney et al. ......... 395/701 |
| 5,822,589 A | | 10/1998 | Diamant et al. ............. 395/704 |
| 5,953,530 A | * | 9/1999 | Rishi et al. .................. 717/127 |
| 6,144,967 A | * | 11/2000 | Nock ...................... 707/103 R |
| 6,195,795 B1 | * | 2/2001 | Block et al. ................... 717/11 |
| 6,219,802 B1 | * | 4/2001 | Beeker et al. ................. 714/32 |
| 6,321,376 B1 | * | 11/2001 | Willis et al. ................. 717/124 |
| 6,345,322 B1 | * | 2/2002 | Humphrey ................... 710/38 |
| 6,434,628 B1 | * | 8/2002 | Bowman-Amuah .......... 714/48 |
| 6,515,967 B1 | * | 2/2003 | Wei et al. .................... 370/244 |

OTHER PUBLICATIONS

Title: ATOM A system for building customized program analysis tools, author: Srivastava et al, ACM, 1994.*
Title: Inoculating software survivability, author: Ghosh et al, ACM, 1999.*
Title: GENOA—A Customizable, Fron–End–Retargetable Source Code Analysis Framework, author: Devanbu, ACM, Apr., 1999.*
Richard Stallman, GNU Make, A program for Directing Recompilation. May 1998, [retrieved Jul. 8, 2002]. Retrieved from the internet:<URL:http://www.gnu.org/manual/make-3.77/html_mono/make.html>.*

* cited by examiner

*Primary Examiner*—Gregory Morse
*Assistant Examiner*—Chameli C. Das
(74) *Attorney, Agent, or Firm*—Duke W. Yee; Marilyn Smith Dawkins

(57) ABSTRACT

A method and apparatus in a data processing system for processing errors during building of a program. A set of tools needed to build the program is identified. Each tool within the set of tools is called. Responsive to a tool within the set of tools generating output, a determination is then made as to whether an error is present in an output generated by the tool. Responsive to determining a presence of the error, a notification is automatically generated.

36 Claims, 2 Drawing Sheets

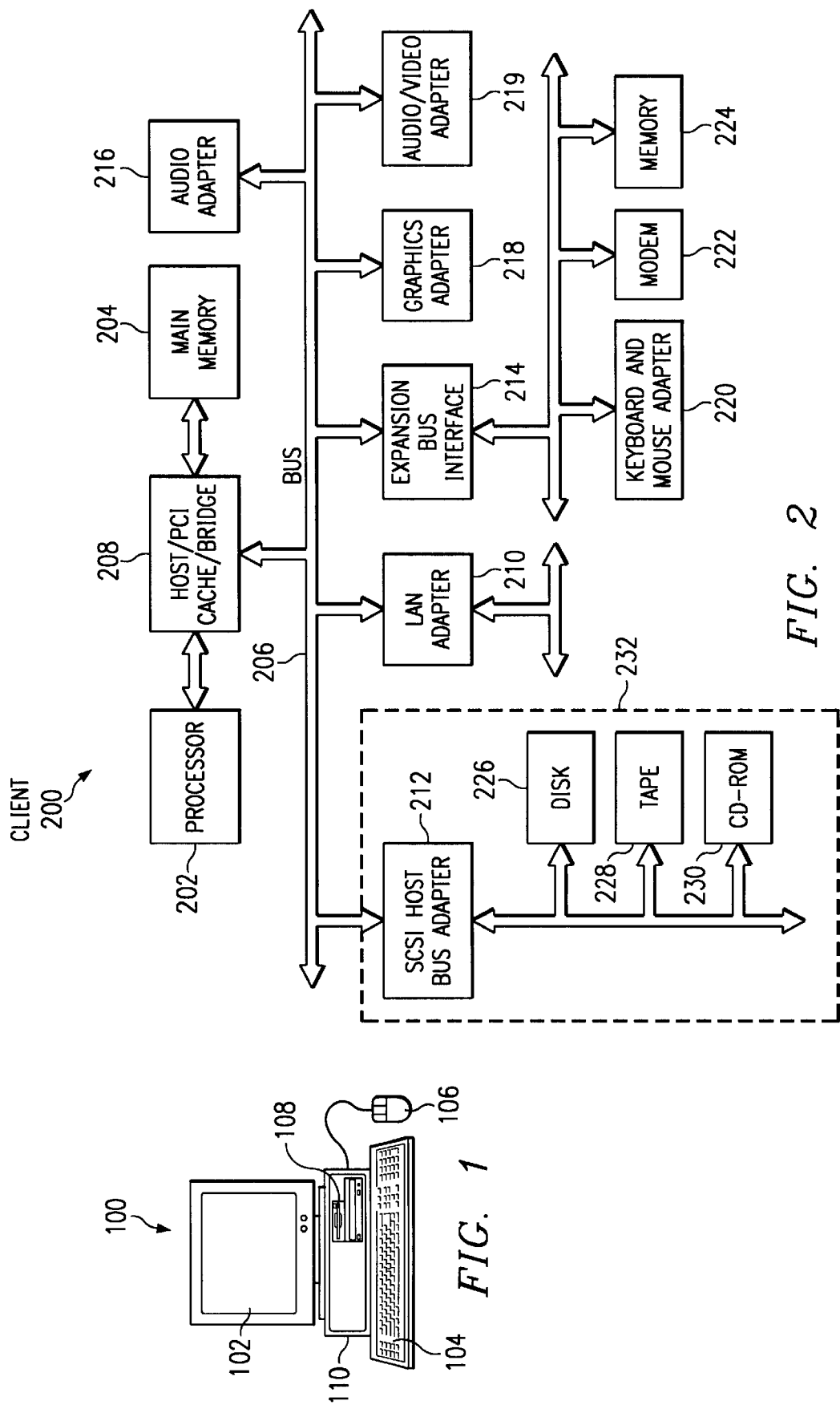

METHOD AND APPARATUS IN A DATA PROCESSING SYSTEM FOR FASTER NOTIFICATION OF ERRORS IN A SOFTWARE BUILD

BACKGROUND OF THE INVENTION

1. Technical Field

The present invention relates generally to an improved data processing system and in particular to a method and apparatus for building a program. Still more particularly, the present invention provides a method and apparatus for identifying errors during compiling and linking of a program.

2. Description of Related Art

In creating programs and applications, developers will generate code in a high level form and use translators to translate the code to create executable program code, which is also referred to as object code. A commonly used translator is a compiler, which translates high level source code into machine language object code. In creating programs and applications, numerous modules may be created, requiring compiling by a compiler. Additionally, data files often are created for use with the modules. A linker is a tool used to link the compiled modules and data files to create an executable program. Other tools also are used in creating programs. These tools include, for example, SED, AWK, COPY, and MSGBIND. The SED utility is a "stream editor", a program that reads a stream of data, makes changes to it, and passes the modified data on. The basic function of AWK is to search files for lines (or other units of text) that contain certain patterns. When a line matches one of the patterns, AWK performs specified actions on that line. MSGBIND is a utility program to bind a binary message file to an executable program. There is usually a separate binary message file for each supported national language. The creation of an executable program from modules and data files is also referred to as a software build.

A tool such as a make utility is used to automatically determine which build steps to execute. It invokes the appropriate build compilers, linkers, and other tools, and directs the output to a log file. GNU make is an example of a make utility. More information on GNU make may be found in GNU make Version 3.77, which is published by the Free Software Foundation 59 Temple Place, Suite 330, Boston, Mass. 02111-1307, ISBN 1-882114-80-9. Determining the success of a software build by a make utility is presently identified by checking the build output in the log file. This log file contains the output from each tool called by the make utility. Currently, this log file is checked for errors to decide the pass or fail status of the software build when the make utility completes execution. A significant amount of time may pass between when an error occurs and when the error is detected. For example, compile time for a program like an operating system may take hours depending on the size and complexity of the program, the speed of the compiler, and the performance of the hardware. Compile errors may happen at the beginning of the process, but the software build will continue to create unaffected parts and log these results to the log file. The analysis currently is postponed until all processes are complete.

Therefore, it would be advantageous to have an improved method and apparatus for quickly identifying errors occurring during a software build.

SUMMARY OF THE INVENTION

The present invention provides a method and apparatus in a data processing system for processing errors during building of a program. A set of tools needed to build the program is identified. Each tool within the set of tools is called. Responsive to a tool within the set of tools generating output, a determination is then made as to whether an error is present in an output generated by the tool. Responsive to determining a presence of the error, a notification is automatically generated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented in accordance with a preferred embodiment of the present invention;

FIG. 2 is a block diagram illustrating a data processing system in which the present invention may be implemented;

DETAILED DESCRIPTION OF THE PREFERRED EMBODIMENT

Figure 3:
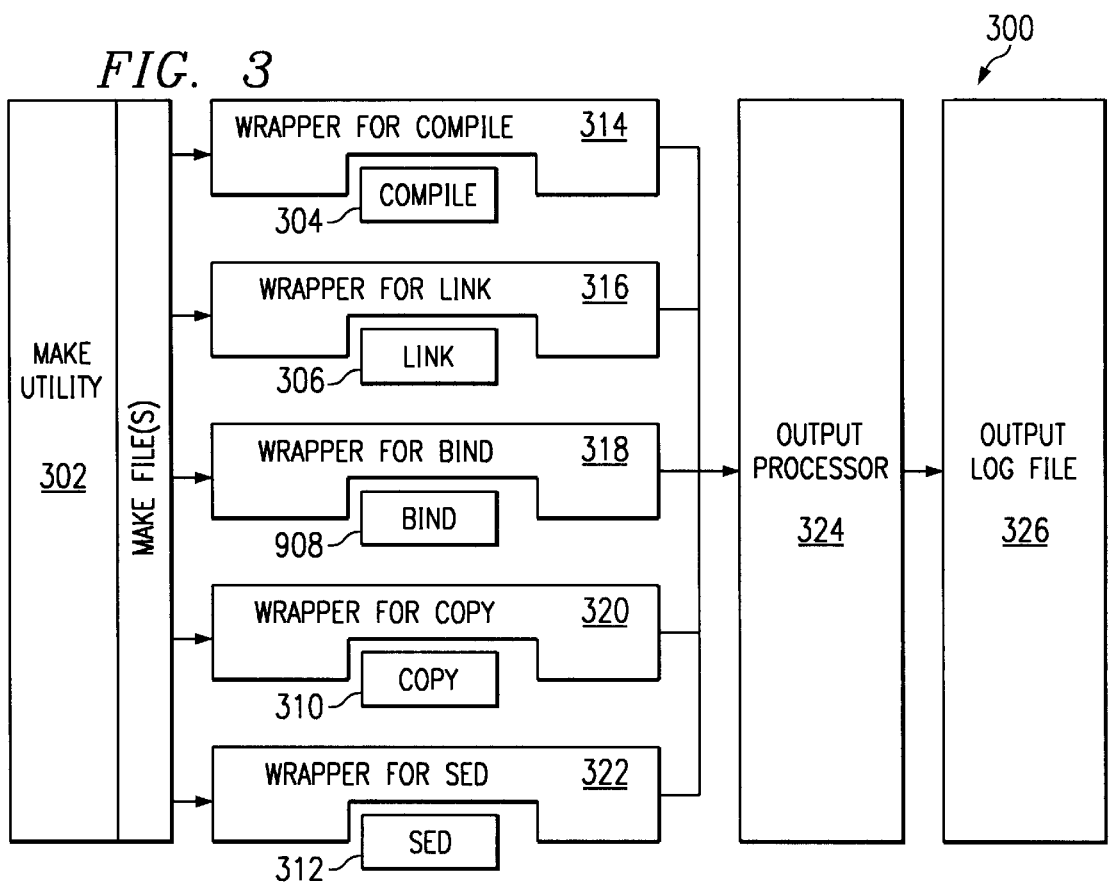
FIG. 3 is a diagram of a software build system depicted in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100.

With reference now to FIG. 2, a block diagram illustrating a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface.

The depicted example in FIG. 2 and above-described examples are not meant to imply architectural limitations. For example, data processing system 200 also may be a notebook computer or hand held computer.

The present invention provides a method, apparatus, and computer implemented instructions for quickly identifying errors during a software build. The mechanism of the present invention intercepts the output from individual tools called by a software build management utility, such as a make utility. The mechanism of the present invention involves providing a wrapper for a tool to intercept calls and direct the calls for analysis as the tool generates output. The analysis may be made by the tool or by a separate analysis unit. Upon detection of an error, various notifications may be made such as, an audible alert, a visual alert or sending a notification to a programmer via a pager. Additionally, notifications may be made when certain selected check points or milestones are reached during the software build process, such as the completion of building major components.

With reference now to FIG. 3, a diagram of a software build system is depicted in accordance with a preferred embodiment of the present invention. Software build system 300 includes a make utility 302. Software build system 300 also includes compile tool 304, link tool 306, bind tool 308, copy tool 310, and SED tool 312. In the depicted examples, wrappers 314–322 are associated with the tools. Make utility 302 will read a make file to determine which build steps are to be performed based on the make file. A make file describes dependencies and relations between different files and tells make utility 302 how to compile and link a program. More information on make files may be found in GNU make Version 3.77.

Based on the make file, a tool will be called by make utility 302. For example, compile tool 304 may be called by make utility 302. Wrapper 314 will take over the call made by make utility 302 to compile tool 304. This interception of a call is accomplished by placing the wrapper ahead of the tool in the calling hierarchy make utility 302. This may be accomplished in a number of ways. For example, the wrapper for a tool may be placed first in a call path or have a higher order file extension.

The output from compile tool 304 is directed to output processor 324. In the depicted example, output processor 324 will check for errors in the output received from a wrapper and generate an alert in response to detecting an error or a build break, which occurs from an error. In the depicted examples, the build analysis occurs immediately whenever output is received from a tool. Additionally, the build status may be updated. The output echoed or sent to output log file 326. This output log contains the output from each tool called by make utility 302. This log provides a chronology of events that occur during a software build. A similar process is used for other tools in software build system 300.

Figure 4:
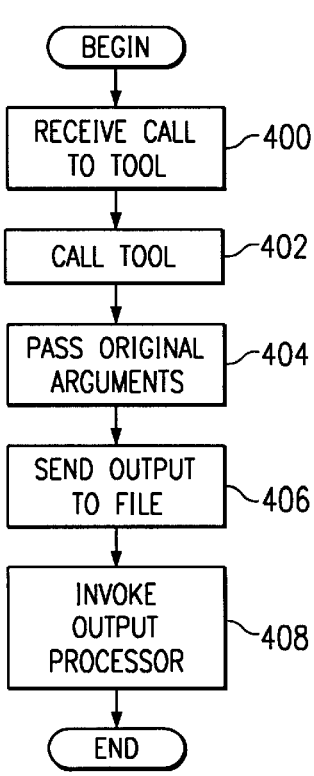
FIG. 4 is a flowchart of a process used in a wrapper depicted in accordance with a preferred embodiment of the present invention.

With reference now to FIG. 4, a flowchart of a process used in a wrapper is depicted in accordance with a preferred embodiment of the present invention. The processes illustrated in FIG. 4 may be implemented in a wrapper, such as wrapper 314, associated with a tool, such as compile tool 304 in FIG. 3.

The process begins by receiving a call to the tool associated with the wrapper (step 400). A call is made to the tool associated to the wrapper (step 402). The original arguments for the received call are passed with the call (step 404). The output is sent to a temporary file (step 406), and an output processor, such as output processor 324 in FIG. 3, is invoked (step 408) with the process terminating thereafter.

Figure 5:
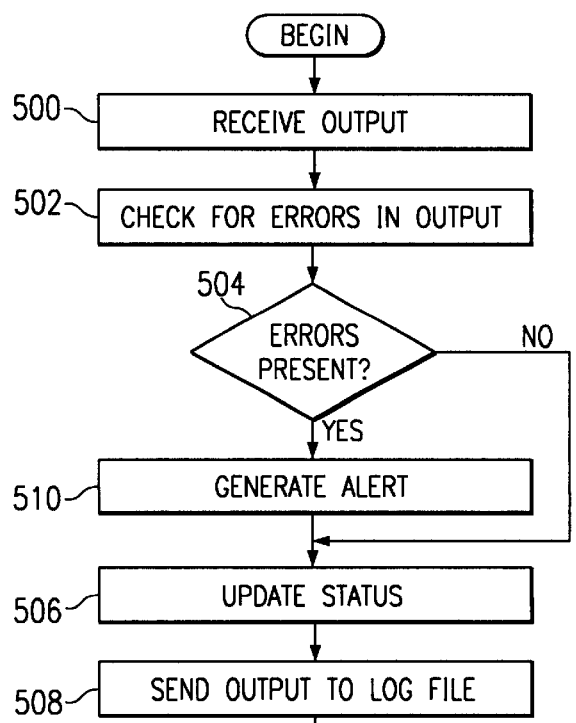
FIG. 5 is a flowchart of a process used by a output processor depicted in accordance with a preferred embodiment of the present invention.

With reference now to FIG. 5, a flowchart of a process used by a output processor is depicted in accordance with a preferred embodiment of the present invention. These processes may be implemented in an output processor, such as output processor 324 in FIG. 3. The process begins by receiving output from a tool (step 500). Thereafter, the output is checked for errors (step 502). A determination is made as to whether an error is present (step 504). If an error is not present the status is updated (step 506), and the output is sent to a log file for later analysis (step 508) with the process terminating thereafter.

With reference again to step 504, if an error is present an alert is generated (step 510) with the process then proceeding to step 506 as described above. This alert may take various forms depending on the implementation. For example, the alert may be in the form of an audible alert at the workstation on which the processes are executing. The alert may be sent to another workstation at which a programmer is located. This alert also may take the form of an email message or a message sent via a pager. Additionally, alerts also may be generated for reaching a check point or milestone in the bill process.

Thus, the present invention provides an ability to perform more immediate detection of errors as they happen during a build process. This advantage is provided by using a wrapper mechanism to intercept calls to tools and routing the output from the tools to an error analysis program, the present invention allows output from a tool to be analyzed individually, rather than waiting for the build process to end. Further, the analysis is directed towards the output of a specific unique step and does not require a re-examination of the entire build log. The depicted example allows for implementation in an established build process without reworking or changing make files.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, a modification may be made to the make utility program to redirect tools to a common wrapper in which this wrapper will invoke the appropriate tool and then invoke the output processor. This allows a single wrapper to be used instead of one for each tool. The modification is made to the make utility program without requiring changes to the make files. Alternatively, the make files may be modified to change the tool calls to the common wrapper. In this case, no change needs to be made to make utility program. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing errors during building of a program, the method comprising the data processing system implemented steps of:
   identifying a set of tools needed to build the program;
   calling each tool within the set of tools to build the program; and
   intercepting the call to each said tool by a wrapper, which then subsequently calls each said tool, wherein the wrapper enables output of each said tool to be immediately analyzed.

2. The method of claim 1, further comprising the step of:
   responsive to a tool within the set of tools generating output, determining whether an error is present in the output generated by the tool, and if so, automatically generating a notification to a user.

3. The method of claim 2, wherein the step of automatically generating a notification comprises at least one of sending an email message and sending a message using a pager system.

4. The method of claim 2, wherein the step of automatically generating a notification comprises generating an audible alert at the data processing system.

5. The method of claim 2, wherein the step of automatically generating a notification comprises generating an visual alert at the data processing system.

6. The method of claim 2, wherein the step of automatically generating a notification comprises generating an audible alert at another data processing system.

7. The method of claim 2, wherein the step of automatically generating a notification comprises generating a visual alert at another data processing system.

8. The method of claim 1 further comprising:
   responsive to a tool within the set of tools completing processing, determining whether a milestone has been reached in building the program in the output generated by the tool; and
   responsive to determining a presence of the milestone, automatically generating a notification.

9. The method of claim 1, wherein the set of tools includes a compiler.

10. The method of claim 1, wherein the set of tools is called in a sequential order.

11. The method of claim 1, wherein the set of tools is called simultaneously.

12. The method of claim 1, wherein the wrapper is a single wrapper used to receive a call to a tool and direct the output from the tool to an output processor.

13. The method of claim 1, wherein the wrapper is a plurality of wrappers, each one being used to receive a call to a respective tool and direct the output from the respective tool to an output processor.

14. A method in a data processing system for processing errors generated during processing of a source code, the method comprising the data processing system implemented step of:
   receiving the source code;
   calling a plurality of tools in a sequence to process the source code; and
   intercepting the call to each said tool by a wrapper, which then subsequently calls each said tool, wherein the wrapper enables output of each said tool to be immediately analyzed.

15. The method of claim 14, further comprising the step of:
   responsive to output being generated by a tool within the plurality of called tools, determining whether an error is present in the output, and if so, generating a notification to a user.

16. The method of claim 15, wherein the step of generating a notification comprises generating an audible alert at another data processing system.

17. The method of claim 15, wherein the step of generating a notification comprises generating a visual alert at another data processing system.

18. The method of claim 14, further comprising the step of:
  responsive to output being generated by a tool within the plurality of called tools, determining whether a milestone in processing of the source code is present in the output, and if so, generating a notification to a user.

19. The method of claim 14, wherein the sequence includes calling at least two tools within the plurality of tools simultaneously.

20. A software build system for use in a data processing system comprising:
  a software build management utility, wherein the software build management utility receives source code for processing and generates calls to process the source code;
  a set of tools, wherein calls to process the source code are (i) intercepted to enable redirection of output from the set of tools, and then (ii) directed towards the set of tools; and
  an output processor, wherein the output processor receives the redirected output, determines whether an error is present, and sends a notification in response to determining that the error is present.

21. A data processing system for processing errors during building of a program, the data processing system comprising:
  identifying means for identifying a set of tools needed to build the program;
  calling means for calling each tool within the set of tools to build the program; and
  wrapper means for intercepting the call to each said tool, which then subsequently calls each said tool, wherein the wrapper means enables output of each said tool to be immediately analyzed.

22. The data processing system of claim 21, further comprising:
  determining means, responsive to a tool within the set of tools generating output, for determining whether an error is present in the output generated by the tool, and if so, generating a notification to a user.

23. The data processing system of claim 21, wherein the generating means comprises means for generating an audible alert at another data processing system.

24. The data processing system of claim 21, wherein the generating means comprises means for generating a visual alert at another data processing system.

25. The data processing system of claim 21 wherein the generating means is a first generating means further comprising:
  determining means, responsive to a tool within the set of tools completing processing, for determining whether a milestone has been reached in building the program in the output generated by the tool; and
  second generating means, responsive to determining a presence of the milestone, for automatically generating a notification.

26. The data processing system of claim 21, wherein the set of tools includes a compiler.

27. The data processing system of claim 21, wherein the set of tools is called in a sequential order.

28. The data processing system of claim 21, wherein the set of tools is called simultaneously.

29. A data processing system for processing errors generated during processing of a source code, the data processing system comprising:
  receiving means for receiving the source code;
  calling means for calling a plurality of tools in a sequence to process the source code; and
  wrapper means for intercepting the call to each said tool, which then subsequently calls each said tool, wherein the wrapper means enables output of each said tool to be immediately analyzed.

30. The data processing system of claim 29, further comprising:
  determining means, responsive to output being generated by a tool within the plurality of called tools, for determining whether an error is present in the output, and if so, generating a notification to a user.

31. The data processing system of claim 29, further comprising:
  determining means, responsive to output being generated by a tool within the plurality of called tools, for determining whether a milestone in processing of the source code is present in the output, and if so, generating a notification to a user.

32. The data processing system of claim 29, wherein the generating means comprises means for generating an audible alert at another data processing system.

33. The data processing system of claim 29, wherein the generating means comprises means for generating a visual alert at another data processing system.

34. The data processing system of claim 29, wherein the sequence includes calling at least two tools within the plurality of tools simultaneously.

35. A computer program product in a computer readable medium for processing errors during building of a program, the computer program product comprising:
  first instructions for identifying a set of tools needed to build the program;
  second instructions for calling each tool within the set of tools to build the program; and
  third instructions for intercepting the call to each said tool, which then subsequently calls each said tool, wherein the third instructions enables output of each said tool to be immediately analyzed.

36. A computer program product in a computer readable medium for processing errors generated during processing of a source code, the computer program product comprising:
  first instructions for receiving the source code;
  second instructions for calling the plurality of tools in a sequence to process the source code; and
  third instructions for intercepting the call to each said tool, which then subsequently calls each said tool, wherein the third instructions enables output of each said tool to be immediately analyzed.

* * * * *